(12) United States Patent
Kretschmer et al.

(10) Patent No.: US 8,463,755 B2
(45) Date of Patent: Jun. 11, 2013

(54) SYSTEM AND METHOD FOR PROVIDING COLLABORATIVE MASTER DATA PROCESSES

(75) Inventors: Matthias Kretschmer, Walldorf (DE); Ronen Cohen, Gesher Haziv (IL); Nimrod Vishnia Shabtai, Kfar Vradim (IL); Shachar Sagi, Amirim (IL); Yoram Horowitz, Kazmiel (IL)

(73) Assignee: SAP AG, Walldorf (DE)

( * ) Notice: Subject to any disclaimer, the term of this patent is extended or adjusted under 35 U.S.C. 154(b) by 351 days.

(21) Appl. No.: 12/827,608

(22) Filed: Jun. 30, 2010

(65) Prior Publication Data
US 2012/0005519 A1    Jan. 5, 2012

(51) Int. Cl.
*G06F 7/00* (2006.01)
*G06F 17/30* (2006.01)

(52) U.S. Cl.
USPC ................ 707/687; 707/802; 714/2

(58) Field of Classification Search
USPC .......................... 707/802, 687; 705/27; 714/2
See application file for complete search history.

(56) References Cited

U.S. PATENT DOCUMENTS

| | | | |
|---|---|---|---|
| 2007/0129986 A1* | 6/2007 | Barnett et al. | 705/8 |
| 2009/0157527 A1* | 6/2009 | Bhambri et al. | 705/26 |
| 2010/0106541 A1* | 4/2010 | Upadhyaya et al. | 705/7 |
| 2010/0306644 A1* | 12/2010 | Underwood et al. | 715/234 |

OTHER PUBLICATIONS

TIBCO Collaborative Information Manager, Statement of Direction, Jul. 2008, 8 pages.
Talend MDM: Open Source Master Data Management Solution; retrieved on May 31, 2010, 2 pages.

* cited by examiner

*Primary Examiner* — Cam Truong
(74) *Attorney, Agent, or Firm* — Buckley, Maschoff & Walwalkar LLC

(57) ABSTRACT

A system and method for providing collaborative master data process management. A master data store comprises data for at least one data domain. A master data management module is configured to provide access to the data to one or more applications. A master data management service module provides at least one service providing access to the data based on a service-oriented architecture. A business process management module is configured to generate, execute and manage at least one business process related to the data domain. The at least one business process uses at least one of the at least one service provided by the master data management service module. A master data process module is configured to generate at least one data process comprising a business process involving an operation on the data.

23 Claims, 7 Drawing Sheets

SYSTEM AND METHOD FOR PROVIDING COLLABORATIVE MASTER DATA PROCESSES

BACKGROUND OF THE INVENTION

1. Field of the Invention

The disclosure set forth herein pertains to the field of computer systems. More particularly, but not by way of limitation, one or more embodiments of the systems and methods described herein are configured to provide collaborative master data processes.

2. Description of the Related Art

Master data management systems provide comprehensive data storage, maintenance and promote data integrity. For example, SAP's Master Data Management Environment system is an integrated system for master data management that uses a Structured Query Language (SQL) database management system, but does not require designers to use SQL for searching, sorting, and retrieving of information. SAP NetWeaver Master Data Management (MDM) is a component is used as a platform to consolidate, cleanse and synchronize master data within a heterogeneous application landscape. It has the ability to distribute internally and externally to SAP and non-SAP applications.

Master data management systems also provide advanced functionality and efficiency. A standard SQL database management system does not support the types of advanced structures necessary for efficiently managing databases of master data. Generally speaking, master data systems provide a thick shell of functionality on top of a SQL-based DBMS to provide a scalable database where data is fully accessible to other SQL-based applications and tools.

Business process management refers to describing, organizing and managing business operations in terms of business processes. Technology is used to enhance business process management and to implement business processes. Although master data is an integral part of business operation, the current integration of master data management systems and business process management systems is limited.

Increasingly, companies and other organizations use multiple enterprise systems to handle business operations, including business operations which require access to master data. Furthermore, individual components of software and hardware within an organization are frequently changed, modified and upgraded. Because of the use of heterogeneous IT landscapes, organizations need a pervasive master data management strategy to avoid the rampant spread of inconsistent or redundant data across their systems. Flexible, well-governed processes for managing and maintaining master data are desirable.

To overcome the problems and limitations described above there is a need for systems and methods that provide collaborative master data processes.

BRIEF SUMMARY OF THE INVENTION

Flexible, well-governed systems and methods are described for providing collaborative master data management processes for managing and maintaining master data. These systems and methods are capable of providing a multi-domain solution for collaborative master data management. These systems and methods may be configured to take advantage of a fully service oriented architecture enable communication based on web services. Furthermore, these systems and methods may be configured to allow an authorized user to generate, modify and manage collaborative master data processes with almost no coding or configuration, or minimal technical expertise required.

In one or more embodiments of the systems and methods set forth in this disclosure, a master data management system functionality is exposed as web services and web-based data governance user interfaces which are wrapped workflow steps and combined within a logical process flow to provide collaborative master data management processes. These systems and methods extend the native capabilities of SAP NetWeaver MDM and the modeling capabilities of SAP NetWeaver BPM.

One or more of the embodiments described enable a system for providing collaborative master data process management. The system for providing collaborative master data process management includes at least one processor.

The system for providing collaborative master data process management further includes a master data store comprising data for at least one data domain.

The system for providing collaborative master data process management further includes a master data management module configured to provide access to the data for the at least one data domain to one or more applications through an application programming interface.

The system for providing collaborative master data process management further includes a master data management service module. The at least one service provides access to the data for the at least one data domain based on a service-oriented architecture.

The system for providing collaborative master data process management further includes a business process management module configured to generate, execute and manage at least one business process related to the data domain. The at least one business process uses at least one of the services provided by the master data management service module.

The system for providing collaborative master data process management further includes a master data process module configured to generate at least one data process. The at least one data process involves an operation on the data for the at least one data domain. For example, the operation may include verifying selected data belonging to the at least one data domain, modifying selected data belonging to the at least one data domain, and/or adding data belonging to the at least one data domain, or any other operation on data for the at least one data domain.

In one or more embodiments of the system for providing collaborative master data process management, the at least one data process includes at least one request to a data steward user. The request may include an action to be performed by the data steward user. A next action of the at least one data process is based on an input provided by the data steward user in response to the at least one request to the data steward user.

In one or more embodiments of the system for providing collaborative master data process management, the at least one data process includes at least one request to a business user. The request may include an action to be performed by the business user. A next action of the at least one data process is based on an input provided by the business user in response to the at least one request to the business user.

In one or more embodiments of the system for providing collaborative master data process management, the master data process module is further configured to generate at least one follow-up business process in response to an exception error state reached in the at least one data process. The at least one follow-up business process may include a proposed change to the at least one data process in response to the exception error state reached in the at least one data process.

One or more embodiments of the system for providing collaborative master data process management further include a master data process display module configured to display a graphical representation of the at least one data process.

One or more embodiments of the system for providing collaborative master data process management further include process step user interface module configured to generate one or more user interfaces corresponding to one or more data process steps.

The master data process display module may be configured to display a graphical representation of at least one follow-up business process in response to an exception error state reached in the at least one data process.

The master data process display module may also be configured to display a graphical representation of a proposed change to the at least one data process in response to an exception error state reached in the at least one data process.

In one or more embodiments, the master data process module is further configured to provide a data process design user interface to an authorized user. The data process design user interface allows the authorized user to generate a custom data process template. The custom data process template includes a custom business process involving a custom operation on data belonging to the at least one data domain.

One or more embodiments described enable a computer-readable medium having computer-readable instructions for providing collaborative master data process management. Execution of the computer-readable instructions by one or more processors causes the one or more processors to carry out process steps detailed herein.

The process steps include generating a data process template. The data process template includes a business process to be invoked upon a triggering event type. The business process involves at least one operation on data belonging to at least one data domain. In one or more embodiments of the computer-readable medium computer-readable medium having computer-readable instructions for providing collaborative master data process management, the process steps further include displaying a graphical representation of the data process template.

In one or more embodiments of the computer-readable medium computer-readable medium having computer-readable instructions for providing collaborative master data process management, the at least one operation includes a verification operation for verifying data against the stored data based on the selected data.

In one or more embodiments of the computer-readable medium computer-readable medium having computer-readable instructions for providing collaborative master data process management, the at least one operation includes a modification operation for modifying the stored data based on the selected data.

In one or more embodiments of the computer-readable medium computer-readable medium having computer-readable instructions for providing collaborative master data process management, the at least one operation includes an addition operation for adding data based on the selected data to the stored data.

The process steps further include initiating a data process in accordance with the data process template based on selected data in response to a triggering event of the triggering event type.

The process steps further include requesting a business action to be performed by a business user involving the selected data, receiving a response from the business user regarding the business action, and determining a next action following the business action based on the response from the business user.

The process steps further include requesting a data action to be performed by a data steward user, receiving a response from the data steward user regarding the data action, and determining a next action following the data action based on the response from the data steward user.

The process steps further include using at least one service provided by a master data management system comprising stored data belonging to the at least one data domain to perform the at least one operation on the selected data. The service is provided by the master data management system based on a service-oriented architecture.

In one or more embodiments of the computer-readable medium computer-readable medium having computer-readable instructions for providing collaborative master data process management, the process steps further include generating at least one follow-up business process in response to an exception error state reached in the data process.

The at least one follow-up business process may include a proposed change to the data process template in response to the reaching of the exception error state in the at least one data process.

In one or more embodiments of the computer-readable medium computer-readable medium having computer-readable instructions for providing collaborative master data process management, the process steps further include displaying a graphical representation of the data process template including the proposed change to the data process template.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for providing collaborative master data process management will now be described. In the following exemplary description numerous specific details are set forth in order to provide a more thorough understanding of embodiments described in this disclosure. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the invention.

Figure 1:
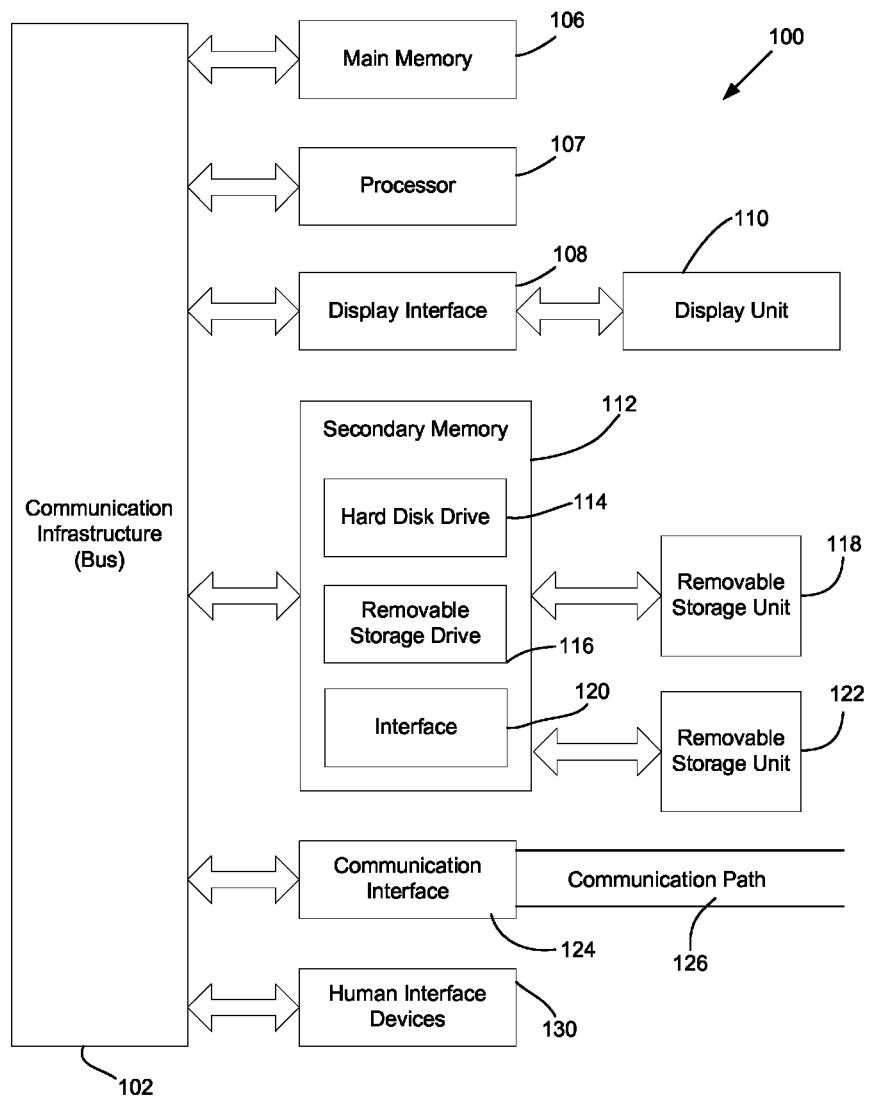
FIG. 1 illustrates a general-purpose computer and peripherals that when programmed as described herein may operate as a specially programmed computer capable of implementing one or more systems and methods for providing collaborative master data process management.

FIG. 1 is a diagram of a system 100 comprising a general-purpose computer and peripherals that, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. Where a virtual machine, process, hardware, device or otherwise performs substantially similarly to that of a physical computer system, such a platform will also fall within the scope of disclosure provided herein, notwithstanding the description herein of a physical system such as that in FIG. 1.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

Figure 2:
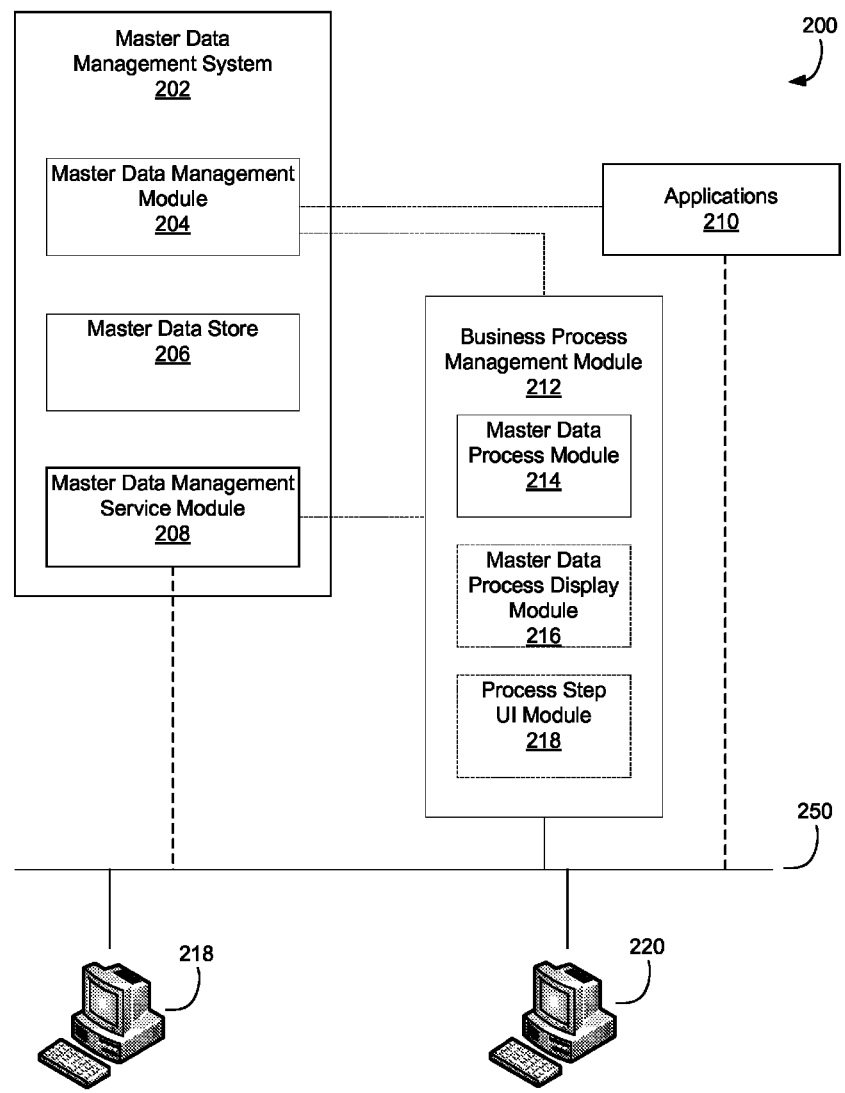
FIG. 2 illustrates a system diagram in accordance with one or more systems and methods for providing collaborative master data process management.

FIG. 2 illustrates a system diagram in accordance with one or more systems and methods for providing collaborative master data process management. System 200 includes one or more applications implementing the features shown on one or more computers. One of ordinary skill in the art would recognize that the features of system 200 are shown in logical modules that may operate independently or with some degree of integration without departing from the spirit or the scope of the invention. System 200 includes master data management system 202. Master data management system 202 is configured to manage and provide access to master data.

Master data management system 202 includes master data management module 204, master data store 206 and master data management service module 208. Master data management module 204, master data store 206 and master data management service module 208 reside in at least one computer memory component on one or more computer systems.

Master data management module 204, master data store 206 and master data management service module 208 may be configured to communicate directly via a communication interface, such as communication infrastructure 102. Master data management module 204, master data store 206 and master data management service module 208 may also be configured to communicate over one or more networks, such as communication path 250. Communication path 250 may include one or more networks, such as Local Area Networks (LAN), Wide Area Networks (WAN), wireless networks, optical networks, distributed networks, the Internet or any combination thereof.

Master data store 206 is configured to store data, such as master data. Master data store 206 resides in at least one module of computer memory. Master data stored in master data store 206 may be stored using a database schema associated with master data management system 202.

Master data store 206 may be configured to store data belonging to at least one data domain. As used herein, the term "data domain" refers to possible values for a set of data that may be stored in master data store 206 using at least one attribute. For example, data domains may include Customers, Products, Accounts, Assets, Materials, Vendors, Suppliers, or any other set of data that may be described and stored in master data store 206 using at least one attribute. One or more embodiments of master data management module 204 provide a multi-domain data solution for enterprise data, thereby supporting multi-domain collaborative master data process management.

Master data management module 204 includes one or more programs or applications configured to access to master data store 206. Master data management module 204 may access the master data stored in master data store 206 using a database schema associated with master data management system 202.

Master data management module 204 may be further configured to provide access to master data store 206 to one or more applications 210. Applications 210 include any executing computer program code configured to access master data store 206, such as through an application programming interface (API) provided by master data management module 204. In one or more embodiments, applications 210 include one or more legacy applications integrated with master data management module 204 to synchronize legacy systems with current data, thereby achieving continued usability of legacy applications. Applications 210 may access master data management system 202 by communicating with master data management module 204. For example, read and write access as well as database operations may be requested by applications 210 through the API via master data management module 204 in order to access master data in master data store 206.

Master data management service module 208 also provides access to master data through services, such as web-based services. Master data management service module 208 provides at least one service based on a service-oriented architecture. The at least one service may be made available for access over a communication path 250. Communication path 250 may include one or more networks, such as Local Area Networks (LAN), Wide Area Networks (WAN), wireless networks, optical networks, distributed networks, the Internet or any combination thereof. Communication path 250 may also include a communication infrastructure within a computer system, such as communication infrastructure 102.

System 200 further includes business process management module 212. Business process management module 212 is configured to generate, execute and manage at least one business process. As used herein, the term "business process" refers to any sequence of one or more tasks or activities to achieve a business purpose. The business process may include fully automated tasks, partially automated tasks, and fully manual tasks to be performed or supervised by a user.

A business process may be invoked upon the occurrence of a triggering event. A triggering event made include any event requiring action within the scope of business operation, such as order placement, customer acquisition, marketing events, audit events, business changes, customer contact, receipt of information from an external source, transfer of information within an organization, system updates, staffing changes, or any other event requiring at least one action within the scope of business operation.

In one or more embodiments, business process management module 212 manages at least one business process related to at least one data domain stored in master data store 206. Business process management module 212 may be configured to manage at least one business process related to multi-domain data. At least one business process managed by business process management module 212 may use at least one service provided by master data management service module 206.

Master data management module 204, master data store 206 and master data management service module 208 may be configured to communicate over one or more networks, such as communication path 126. Business process management module 212 and master data management system 202 may also be configured to communicate directly via a communication interface, such as communication infrastructure 102. One of ordinary skill in the art would appreciate that when business process management module 212 communicates with master data management system 202, many methods for connection are available which are within the scope and spirit of the invention. For example, business process management module 212 may access services provided by master data management service module 208 through a service-oriented architecture. Business process management module 212 may also access master data management system 202 through an application programming interface (API) via master data management module 204 in order to access master data in master data store 206.

Business process management module 212 includes master data process module 214. One of ordinary skill in the art would recognize that master data process module 214 may be implemented as an independent software module within business process management module 212, an integrated feature of general business process management implemented in business process management module 212, or any other degree of integration without departing from the spirit or the scope of the invention. Master data process module 214 is configured to generate at least one data process involving an operation on data for at least one data domain managed by master data management system 202. As used herein, the term "data process" refers to a business process involving an operation on data belonging to at least one data domain. The operation may be any operation related to the at least one data domain, such as verifying selected data, modifying selected data and adding additional data. One or more embodiments of master data process module 214 are configured to generate business processes involving operations on multi-domain data.

Business process management module 212 is configured to manage data processes generated by master data process module 214. One or more embodiments of business process management module 212 are configured to manage business processes involving operations on multi-domain data.

The data process may be generated in accordance with a data process template. As used herein, the term "data process template" refers to any set of information usable to describe a business process to be invoked upon a triggering event type specified by the data process template.

In one or more embodiments, master data process module 214 is configured to provide a data process design user interface to a user authorized to generate data process template. The data process design user interface allows the authorized user to generate a custom data process template. The custom data process template includes a custom business process involving a custom operation on data for at least one data domain.

A data process generated by master data process module 214 may include at least one request to a user. The request may include an action to be performed by the user, where a next action of the data process is based on an input provided by the user in response to the request. The requests are further detailed below with respect to two user types: a data steward user and a business user. However, a person of ordinary skill in the art would recognize that data processes may request actions from multiple users of any user type without departing from the spirit and the scope of the invention.

A data process generated by master data process module 214 may include at least one request to a data steward user. As used herein, the term "data steward user" is broadly defined to include any user with some level of authorization to access master data management system 202. The request may include an action to be performed by the data steward user, where a next action of the data process is based on an input provided by the data steward user in response to the request.

For example, a data steward user may be requested to perform an action involving data, such as verifying new or modified data with an internal data source or an external data source, checking data integrity, checking data accuracy, checking data relationships before the removal or modification of data, or any other action that the data steward user has authority to perform within the scope of his employment.

A data process generated by master data process module 214 may include at least one request to a business user. In one or more embodiments, the term "business user" may be broadly defined to include any user without administrative privileges in master data management system 202. Alternatively, the term "business user" may be broadly defined to include any user with authority to approve an action related to the master data, without excluding users with administrative privilege in master data management system 202. The request may include an action to be performed by the business user, where a next action of the data process is based on an input provided by the business user in response to the request.

For example, a business user may be requested to perform an action involving reviewing an action of another user, confirming proposed changes, acknowledgment of a notification, initiating a business process in response to an error state, or any other action that the business user has authority to perform within the scope of his employment.

In one or more embodiments, master data process module 214 is further configured to generate at least one follow-up business process in response to an error state reached in a data process. In one or more embodiments, master data process module 214 is configured to recognize an error state when a type of error occurs for which follow-up action is desirable. Follow-up action may include verification of data with an internal data source or an external data source, auditing data, auditing software and hardware systems, auditing employee actions, auditing existing business processes and data processes, or any other follow-up action in response to an error of a type for which follow-up action is desirable. For example, the error state may be reached based on input from a business user in response to a request, input from a data steward user in response to a request, an error indicated by a hardware or software element of master data management system 202 or business process management module 212, or any other occurrence resulting in arrival at an error state. In one or more embodiments, the error state is an exception error state that potentially requires a change of the data process. The follow-up business process may include a proposed change to the data process template for the data process associated with the exception error state.

In one or more embodiments, business process management module 212 optionally includes master data process display module 216. Master data process display module 216 is configured to display a graphical representation of one or more data processes generated by master data process module 214. In one or more embodiments, the graphical representation includes a flowchart view of at least a portion of one or more data processes. Master data process display module 216 may be further configured to display a graphical representation of at least one follow-up business process in response to an exception error state associated with a data process that potentially requires a change of the data process. Master data process display module 216 may be further configured to display a graphic or presentation of a proposed change to the data process template for the data process associated the exception error state.

In one or more embodiments, business process management module 212 optionally includes process step user interface module 218. Process step user interface module 218 is configured to generate one or more user interfaces corresponding to one or more data process steps. The generation of the one or more user interfaces may be fully or partially automated and/or fully or partially customizable. During execution of a data process step, the corresponding user interface is provided to one or more users, such as a business user and/or a data steward user.

Figure 3:
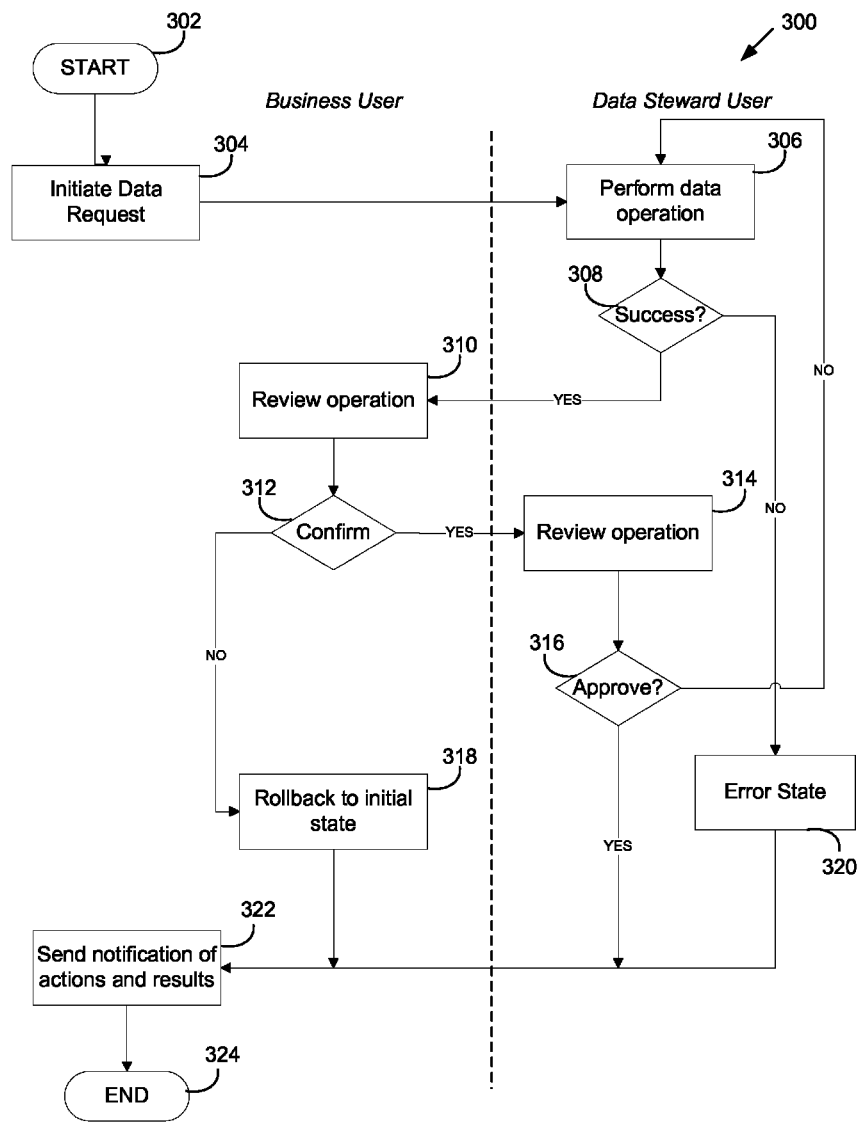
FIG. 3 is a diagram outlining a two-user data process in accordance with one or more systems and methods for providing collaborative master data process management.

FIG. 3 is a diagram outlining an exemplary two-user data process in accordance with one or more systems and methods for providing collaborative master data process management. One of ordinary skill in the art would appreciate that although a two-user data process is shown, a data process may involve any number of users. Furthermore, a data process may involve one or more partially or fully automated steps, and user action may only be required when certain conditions are met. Process 300 starts at step 302.

Processing continues to step 304, where a data process is initiated. The data process may be initiated by a user, a web service, a request form, a user interface, or any other triggering event for the data process. The data process may require the performance of an operation involving any addition, modification, or deletion of master data related to one or more data domains managed by a master data management system in accordance with systems and methods for providing collaborative master data process management.

Processing continues to step 306, where a request to perform a data operation is made to the data steward user. For example, the data operation may include verifying selected data in the at least one data domain, modifying selected data from the at least one data domain, adding additional data to the at least one data domain, and/or any other operation on data for the at least one data domain.

Processing continues to decision step 308, where the data steward user provides input indicating whether or not the data steward user successfully performed the data operation. If the data steward user indicates that the operation is successful, processing continues to step 310. Otherwise, processing continues to step 320, where an error state is determined. From the determination of the error state at step 320, processing continues to step 322.

Returning step 310, a request is made to the business user to review the previous action of the data steward user at step 306. In one or more embodiments, the request at step 310 may be made to either a different business user or the same business user who initiated the data request of step 304.

Processing continues to decision step 312, where the business user provides input indicating whether or not the business user confirms the action as previously requested in step 310. If the business user indicates confirmation, processing continues to step 314. Otherwise, if the business user does not confirm the activity, processing continues to step 318, where a roll back to the initial state is performed. From the roll back at step 318, processing then continues to step 322.

At step 314, a request is made to the data steward user to review the operation and to give final approval. In one or more embodiments, the request at step 314 may be made to either a different data steward user or the same data steward user requested to perform the data operation at step 306. In one or more embodiments, step 314 is an automated activity that occurs under the supervision of the data steward user, such as a service call.

Processing continues to decision step 316, where the data steward user provides input indicating whether or not the data steward user gives final approval. If the data steward user gives final approval, processing continues to step 322. Otherwise, if the data steward user does not give final approval, processing continues back to step 306, and the data process is repeated.

At step 322, notifications of the actions, results, and any errors are sent. For example, notifications may be sent to participant users, such as the business user and data steward user, nonparticipant users, and/or applications. Different notifications may be sent based on the actual result of the data process. Notifications may be provided through a custom application or by any traditional method of notification, including electronic messaging systems such as e-mail, SMS message, MMS message, system notifications, or any other electronic messaging service.

Processing continues to step 324, where process 300 terminates.

Figure 4:
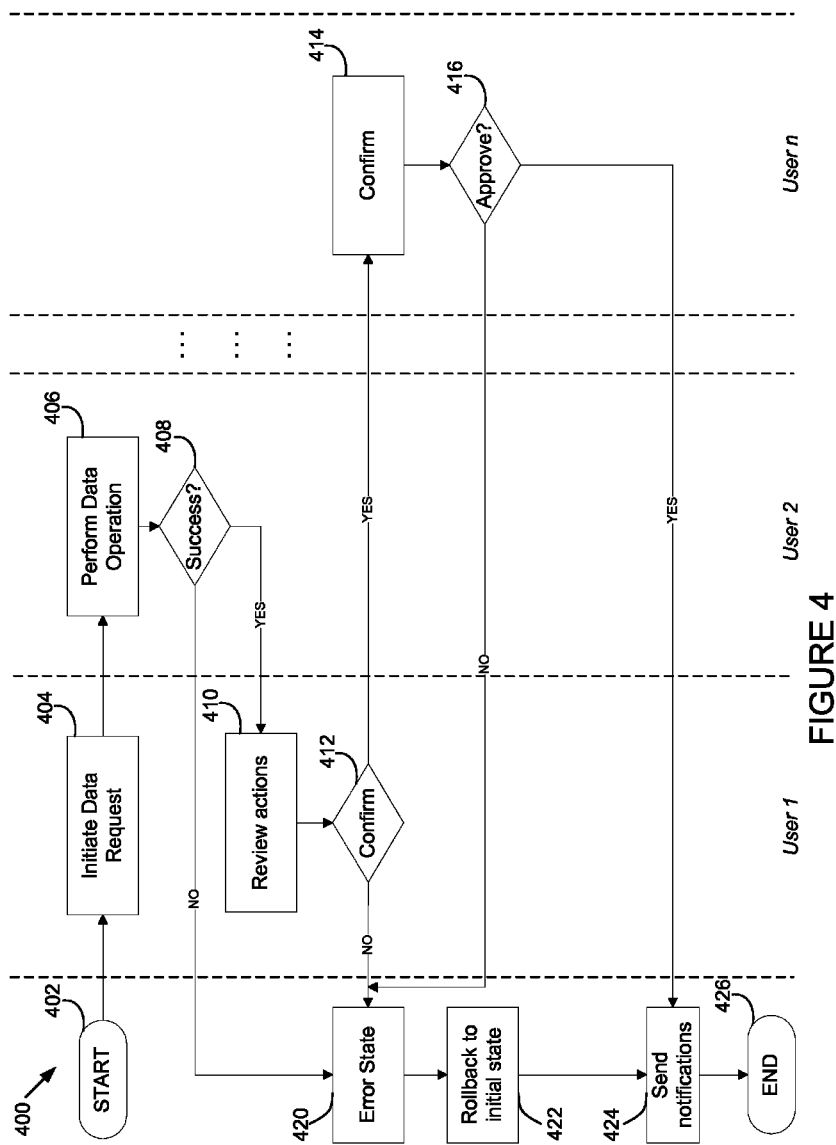
FIG. 4 is a diagram outlining a multi-user data process in accordance with one or more systems and methods for providing collaborative master data process management.

FIG. 4 is a diagram outlining an exemplary multi-user data process in accordance with one or more systems and methods for providing collaborative master data process management. One of ordinary skill in the art would appreciate that a data process may involve any number of users. Furthermore, a data process may involve one or more partially or fully automated steps, and user action may only be required when certain conditions are met. Process 400 starts at step 402.

Processing continues to step 404, where a first user initiates a data request. The data request may include any addition, modification, or deletion of data related to one or more data domains managed by a master data management system in accordance with systems and methods for providing collaborative master data process management.

Processing continues to step 406, where a request to perform a data operation is made to a second user. For example, the data operation may include verifying selected data in the at least one data domain, modifying selected data from the at least one data domain, adding additional data to the at least one data domain, and/or any other operation on data for the at least one data domain.

Processing continues to step 408, where the second user provides input indicating whether or not the second user has successfully performed the data operation. If the second user indicates that the operation is successful, processing continues to step 410. Otherwise, processing continues to step 420, where an error state is determined.

At step 410, a request is made to the first user to review the previous action of the second user at step 406. In one or more embodiments, the request at step 410 is made to a third user.

Processing continues to decision step 412, where the first user provides input indicating whether or not the first user has confirmed the action as previously requested in step 410. If the first user indicates confirmation, processing continues to step 414. Otherwise, if the first user does not confirm the activity, processing continues to step 420, where an error state is determined.

Processing continues to step 414, where the request is sent to an n-th user to give final confirmation. Processing continues to decision step 416, where the n-th user provides input indicating whether or not the paste n-th user gives final approval. If the n-th user gives final approval, processing continues to step 424. In one or more embodiments, steps 414-416 are an automated activity that occurs under the supervision of the data steward user, such as a service call.

Returning to step 420, where an error state is determined. Processing continues to step 422, where any changes made to the master data management system are rolled back such that the master data management system is in the initial state prior to the initiation of process 400. Processing continues to step 424.

At step 424, notification of the actions, results, and any errors are sent. For example, notifications may be sent to participant users, nonparticipant users, and/or applications. Different notifications may be sent based on the actual result of the data process. Notifications may be provided through a custom application or by any traditional method of notification, including electronic messaging systems such as e-mail, SMS message, MMS message, system notifications, or any other electronic messaging service.

Processing continues to step 426, where process 400 terminates.

Figure 5:
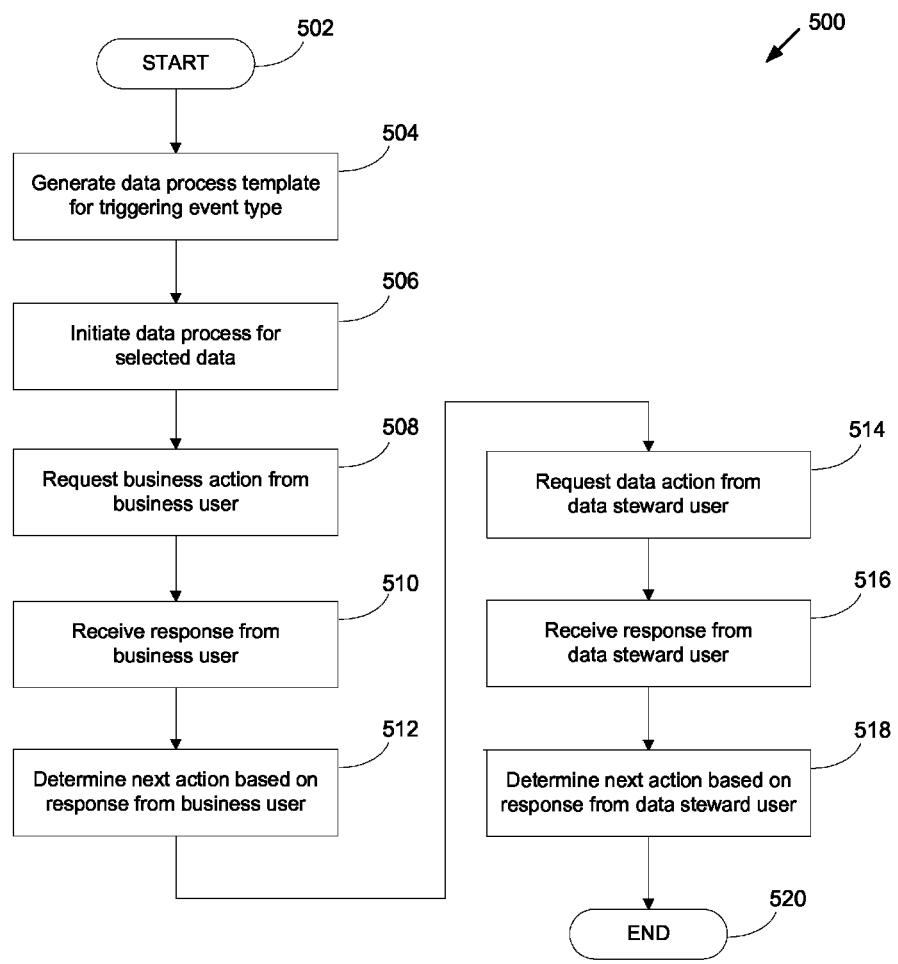
FIG. 5 is a flowchart of a process for generating and handling a data process in accordance with one or more systems and methods for providing collaborative master data process management.

FIG. 5 is a flowchart of a process for generating and handling a data process in accordance with one or more systems and methods for providing collaborative master data process management. Process 500 begins at step 502.

Processing continues to step 504, where a data process template for a triggering event type is generated. For example, a data process template may be generated for triggering event types such as order placement, customer acquisition, marketing events, audit events, business changes, customer contact, system updates, staffing changes, or any other event type requiring action within the scope of business operation.

In one or more embodiments, a data process design user interface is provided to allow an authorized user to generate a custom data process template. The custom data process template includes a custom business process involving custom operation on data for at least one data domain. In one or more embodiments, the custom business process involves a custom operation on multi-domain data.

Processing continues to step 506, where a data process for selected data is initiated upon a triggering event of the triggering event type. The data process is initiated in accordance with the data process template associated with the triggering event type. For example, the triggering event types may be order placement, customer acquisition, marketing events, audit events, business changes, customer contact, system updates, staffing changes, or any other event type requiring action within the scope of operation for an organization.

Processing continues to step 508, where a business action is requested from a business user. For example, the business action may include at least one of verifying data with an external source, approving a previous action by another user, approving an automated action by a computer application, coordinating with another user, contacting another individual or company, making a business decision, or any other action the business user has authority to perform within the scope of his employment.

Processing continues to step 510, where a response is received from the business user. The response includes input from the business user regarding the performance of the requested business action by the business user.

Processing continues to step 512, where the next action of the data process is determined based on the response from the business user.

Processing continues to step 514, where a data action is requested from a data steward user. For example, the data action may include at least one of verifying data with an external source, approving a previous action by another user, approving an automated action by a computer application, interacting with a master data management system, interacting with another software application, modifying a master data management system, modifying another software application, modifying one or more hardware or software configurations, coordinating with another user, contacting another individual or company, or any other action the data steward user has authority to perform within the scope of his employment.

Processing continues to step 516, where a response is received from the data steward user. The response includes input from the data steward user regarding the performance of the requested data action by the data steward user.

Processing continues to step 518, where the next action of the data process is determined based on the response from the data steward user.

Processing continues to step 520, where process 500 terminates.

Figure 6:
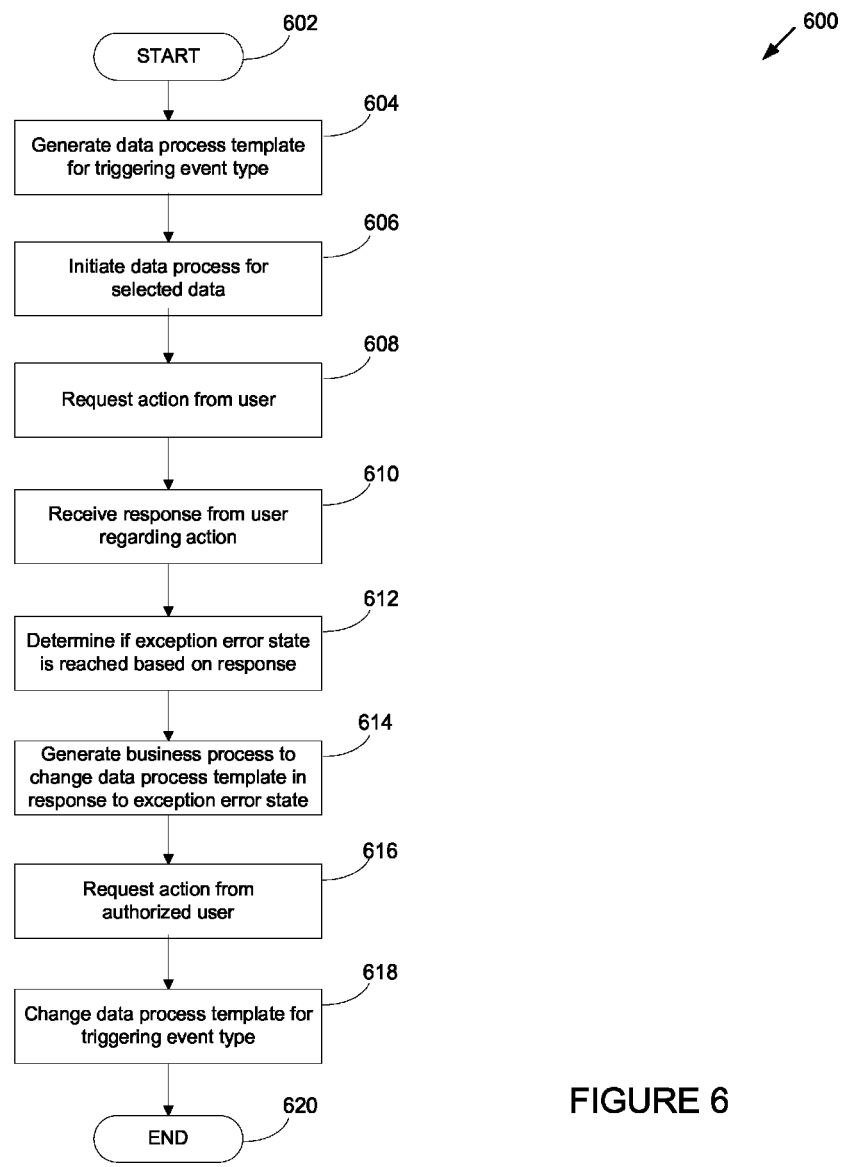
FIG. 6 is a flowchart of a process for generating and handling an exception error state in a data process in accordance with one or more systems and methods for providing collaborative master data process management.

FIG. 6 is a flowchart of a process for generating and handling an error state in a data process in accordance with one or more systems and methods for providing collaborative master data process management. Process 600 begins at step 602.

Processing continues to step 604, where a data process template for triggering event type is generated. For example, the triggering event types may be order placement, customer acquisition, marketing events, audit events, business changes, customer contact, system updates, staffing changes, or any other event type requiring action within the scope of operation for an organization.

In one or more embodiments, a data process design user interface is provided to allow an authorized user to generate a custom data process template. The custom data process template includes a custom business process involving a custom operation on data for at least one data domain. In one or more embodiments, the custom business process involves a custom operation on multi-domain data.

Processing continues to step 606, where a data process for selected data is initiated upon a triggering event of the triggering event type. The data process is initiated in accordance with the data process template associated with the triggering event type.

Processing continues to step 608, where an action is requested from a user.

Processing continues to step 610, where a response is received from the user. The response includes input from the user regarding the performance of the requested action by the user.

Processing continues to step 612, where it is determined whether an exception error state has been reached based on the response received from the user. In one or more embodiments, master data process module 214 is configured to reach an exception error state when a type of error occurs that potentially requires a change of the data process. Multiple error types may be considered, in which case step 612 differentiates between an error type which the data process is designed to handle and an exception error state that potentially requires a change of the data process. The exception error state may be reached when a sitation arises that the data process is not designed to handle. In one or more embodiments, when a frequency of occurrence of errors of a type the data process is designed to handle becomes high, is determined that an exception error state is reached, and to be appropriate to consider a change in the data process. One or more embodiments include multiple types of exception error states.

Processing continues to step 614, where a business process is generated in response to the exception error state. In one or more embodiments, the business process generated in response to the exception error state is directed to changing the data process template that the data process generating the exception error state is based on. For example, the business process may involve a review of the data process template in view of the triggering event and selected data.

Processing continues to step 616, where an action is requested from an authorized user. The authorized user includes any user with authority to approve changes to a data process template.

Processing continues to step 618, where the data process template for the triggering event type is successfully changed through the business process generated in response to the exception error state reached in the data process.

Processing continues to step 620, where process 600 terminates.

Figure 7:
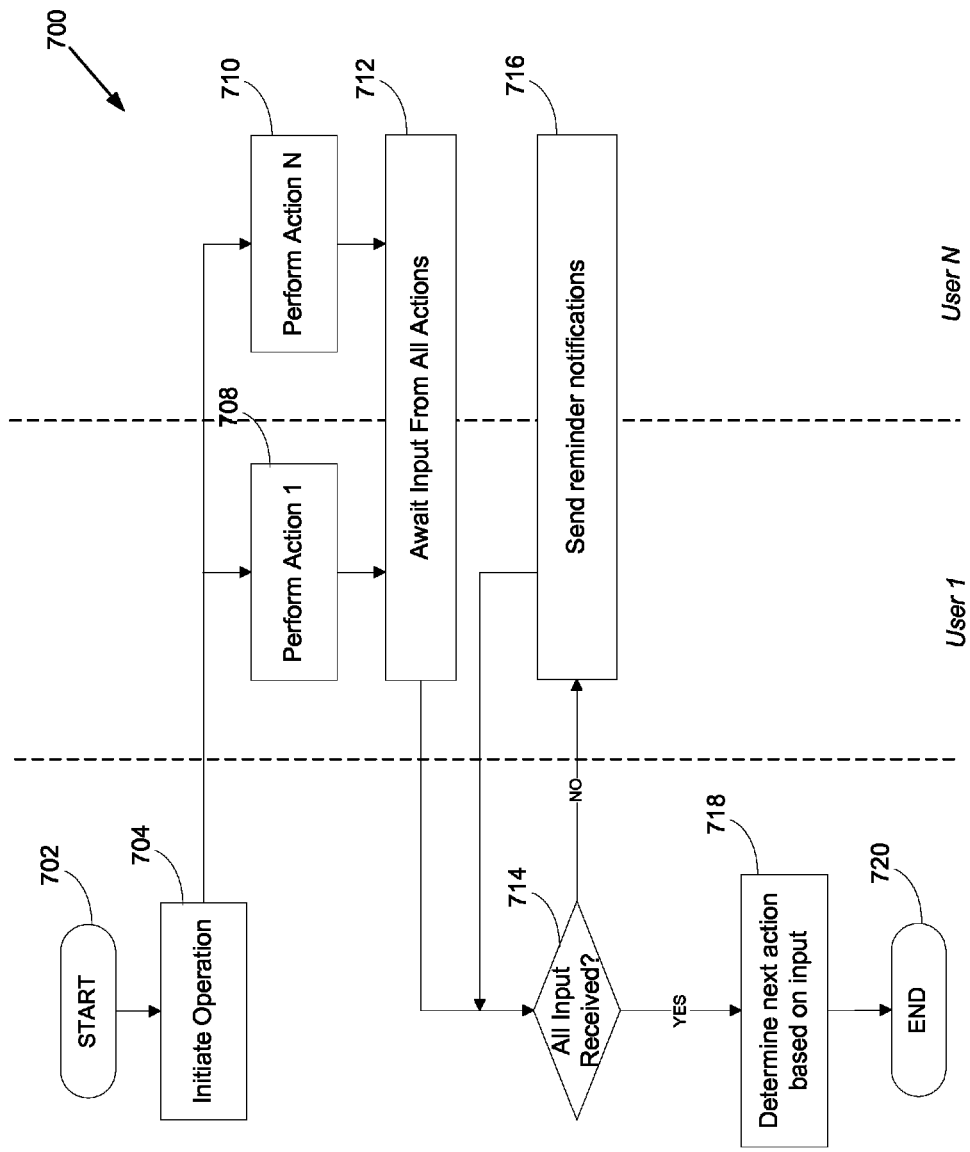
FIG. 7 is a diagram outlining a parallel data process in accordance with one or more systems and methods for providing collaborative master data process management.

One of ordinary skill in the art would appreciate that systems and methods for providing collaborative master data process management may include steps to be performed in parallel without departing from the spirit and scope of the invention. FIG. 7 is a diagram outlining a parallel data process in accordance with one or more systems and methods for providing collaborative master data process management.

Process 700 begins at step 702 and continues to step 704, where a data operation is initiated. Processing continues to steps 708-710, where requests are sent to multiple users to perform multiple actions associated with the data operation initiated in step 704. Processing continues to step 712, where the process awaits input from the multiple users in response to the multiple actions.

Processing continues to decision step 714, where it is determined whether or not all required input is received. If the required input is not yet received, processing continues to step 716, where reminder notifications are sent regarding the missing input. In one or more embodiments, reminder notifications are sent to users who have not provided input within a predetermined period of time. A reminder notification may be sent to an administrative user after a prolonged period, such as after multiple reminders (not shown). Notifications may be provided through a custom application or by any traditional method of notification, including electronic messaging systems such as e-mail, SMS message, MMS message, system notifications, or any other electronic messaging service.

Returning to decision step 714, after the required input is received, processing continues to step 718, where a next action is determined based on input received. For example, if all users indicate the successful performance of their assigned actions, the next action may include review and confirmation steps. If any user indicates failure, the next action may include a rollback, error handling, reevaluating a data process template associated with the data process, an action by another user to address a condition causing the failure, or any other appropriate action based on the input received from the multiple users.

Processing continues to step 720, where process 700 terminates.

While the invention herein disclosed has been described by means of specific embodiments and applications thereof, numerous modifications and variations could be made thereto by those skilled in the art without departing from the scope of the invention set forth in the claims.

What is claimed is:

1. A system for providing collaborative master data process management, comprising:
    at least one processor;
    a master data store comprising data for at least one data domain;
    a master data management module configured to provide access to said data for said at least one data domain to one or more applications through an application programming interface;
    a master data management service module providing at least one service providing access to said data for said at least one data domain based on a service-oriented architecture;
    a business process management module configured to generate, execute and manage at least one business process related to said at least one data domain, wherein said at least one business process uses at least one of said at least one service provided by said master data management service module;
    a master data process module configured to generate at least one data process comprising a business process involving an operation on said data for said at least one data domain; and
    a master data process display module configured to display a graphical representation of said at least one data process;
    wherein said master data process module is further configured to generate at least one follow-up business process in response to an exception error state reached in said at least one data process;
    wherein said at least one follow-up business process comprises a proposed change to a data process template associated with said at least one data process in response to said exception error state reached in said at least one data process;
    wherein said at least one data process is designed to handle errors of a first type; and
    wherein said exception error state reached in said at least one data process is not reached upon a first occurrence of an error of said first type that said at least one data process is designed to handle, but said exception error state is reached when a frequency of occurrence of errors of said first type that said at least one data process is designed to handle becomes high;
    wherein said master data process display module is further configured to display a graphical representation of a proposed change to a data process template associated with said at least one data process in response to an exception error state reached in said at least one data process;
    wherein said master data process module is further configured to provide a data process design user interface to an authorized user; and
    wherein said data process design user interface allows said authorized user to generate a custom data process template comprising a custom business process involving a custom operation on said data for said at least one data domain.

2. The system of claim 1, wherein said operation comprises verifying selected data for said at least one data domain.

3. The system of claim 1, wherein said operation comprises modifying selected data for said at least one data domain.

4. The system of claim 1, wherein said operation comprises adding additional data for said at least one data domain.

5. The system of claim 1, wherein said at least one data process comprises at least one request to a data steward user, wherein said request comprises an action to be performed by said data steward user and wherein a next action of said at least one data process is based on an input provided by said data steward user in response to said at least one request.

6. The system of claim 1, wherein said at least one data process comprises at least one request to a business user, wherein said request comprises an action to be performed by said business user and wherein said request comprises an action to be performed by said data steward user, wherein a next action of said at least one data process is based on an input provided by said business user in response to said at least one request.

7. The system of claim 1, wherein said master data process display module is further configured to display a graphical representation of at least one follow-up business process in response to an exception error state reached in said at least one data process.

8. The system of claim 1, further comprising a process step user interface module configured to generate one or more user interfaces corresponding to one or more data process steps.

9. A non-transitory computer-readable medium having computer-readable instructions for providing collaborative master data process management, wherein execution of said computer-readable instructions by one or more processors causes said one or more processors to carry out the steps of:
    generating a data process template comprising a business process to be invoked upon a triggering event type, wherein said business process involves at least one operation on data belonging to at least one data domain;
    initiating a data process in accordance with said data process template based on selected data in response to a triggering event of said triggering event type;
    requesting a business action to be performed by a business user involving said selected data;
    receiving a response from said business user regarding said business action;
    determining a next action following said business action based on said response from said business user;
    requesting a data action to be performed by a data steward user;
    receiving a response from said data steward user regarding said data action;
    determining a next action following said data action based on said response from said data steward user;
    using at least one service provided by a master data management system comprising stored data belonging to said at least one data domain to perform said at least one operation on said selected data;
    providing a data process design user interface to an authorized user, wherein said data process design user interface allows said authorized user to generate a custom data process template comprising a custom business process involving a custom operation on said data for said at least one data domain; and
    generating at least one follow-up business process in response to an exception error state reached in said data process;
    wherein said at least one follow-up business process comprises a proposed change to said data process template in response to said exception error state reached in said data process;

wherein said data process is designed to handle errors of a first type; and wherein said exception error state reached in said data process is not reached upon a first occurrence of an error of said first type that said data process is designed to handle, but said exception error state is reached when a frequency of occurrence of errors of said first type that said data process is designed to handle becomes high.

10. The computer-readable medium of claim 9, wherein said at least one operation comprises a verification operation for verifying data against said stored data belonging to said at least one data domain based on said selected data.

11. The computer-readable medium of claim 9, wherein said at least one operation comprises a modification operation for modifying said stored data belonging to said at least one data domain based on said selected data.

12. The computer-readable medium of claim 9, wherein said at least one operation comprises an addition operation for adding data based on the selected data to said stored data belonging to said at least one data domain.

13. The computer-readable medium of claim 9, wherein said steps further comprise displaying a graphical representation of said data process template comprising said proposed change.

14. A method comprising:
generating, by a processor, a data process template comprising a business process to be invoked upon a triggering event type, wherein said business process involves at least one operation on data belonging to at least one data domain;
initiating, by a processor, a data process in accordance with said data process template based on selected data in response to a triggering event of said triggering event type;
requesting, by a processor, a business action to be performed by a business user involving said selected data;
receiving, by a processor, a response from said business user regarding said business action;
determining a next action following said business action based on said response from said business user;
requesting, by a processor, a data action to be performed by a data steward user;
receiving, by a processor, a response from said data steward user regarding said data action;
determining, by a processor, a next action following said data action based on said response from said data steward user;
using, by a processor, at least one service provided by a master data management system comprising stored data belonging to said at least one data domain to perform said at least one operation on said selected data;
providing, by a processor, a data process design user interface to an authorized user, wherein said data process design user interface allows said authorized user to generate a custom data process template comprising a custom business process involving a custom operation on said data for said at least one data domain; and
generating, by a processor, at least one follow-up business process in response to an exception error state reached in said data process;
wherein said at least one follow-up business process comprises a proposed change to said data process template in response to said exception error state reached in said data process;
wherein said data process is designed to handle errors of a first type; and
wherein said exception error state reached in said data process is not reached upon a first occurrence of an error of said first type that said data process is designed to handle, but said exception error state is reached when a frequency of occurrence of errors of said first type that said data process is designed to handle becomes high.

15. The method of claim 14, wherein said at least one operation comprises a verification operation for verifying data against said stored data belonging to said at least one data domain based on said selected data.

16. The method of claim 14, wherein said at least one operation comprises a modification operation for modifying said stored data belonging to said at least one data domain based on said selected data.

17. The method of claim 14, wherein said at least one operation comprises an addition operation for adding data based on the selected data to said stored data belonging to said at least one data domain.

18. The method of claim 14, further comprising displaying a graphical representation of said data process template comprising said proposed change.

19. A system comprising:
one or more processors to:
generate a data process template comprising a business process to be invoked upon a triggering event type, wherein said business process involves at least one operation on data belonging to at least one data domain;
initiate a data process in accordance with said data process template based on selected data in response to a triggering event of said triggering event type;
request a business action to be performed by a business user involving said selected data;
receive by a processor, a response from said business user regarding said business action;
determine a next action following said business action based on said response from said business user;
request a data action to be performed by a data steward user;
receive a response from said data steward user regarding said data action;
determine a next action following said data action based on said response from said data steward user;
use at least one service provided by a master data management system comprising stored data belonging to said at least one data domain to perform said at least one operation on said selected data;
provide a data process design user interface to an authorized user, wherein said data process design user interface allows said authorized user to generate a custom data process template comprising a custom business process involving a custom operation on said data for said at least one data domain; and
generate at least one follow-up business process in response to an exception error state reached in said data process;
wherein said at least one follow-up business process comprises a proposed change to said data process template in response to said exception error state reached in said data process;
wherein said data process is designed to handle errors of a first type; and
wherein said exception error state reached in said data process is not reached upon a first occurrence of an error of said first type that said data process is designed to handle, but said exception error state is reached when a frequency of occurrence of errors of said first type that said data process is designed to handle becomes high.

20. The system of claim 19, wherein said at least one operation comprises a verification operation for verifying data against said stored data belonging to said at least one data domain based on said selected data.

21. The system of claim 19, wherein said at least one operation comprises a modification operation for modifying said stored data belonging to said at least one data domain based on said selected data.

22. The system of claim 19, wherein said at least one operation comprises an addition operation for adding data based on the selected data to said stored data belonging to said at least one data domain.

23. The system of claim 19, the one or more processors further to display a graphical representation of said data process template comprising said proposed change.

* * * * *